C. W. HILL.
ELECTRODE FOR FLAMING ARC LAMPS.
APPLICATION FILED SEPT. 21, 1910.

1,007,869.

Patented Nov. 7, 1911.

Witnesses
E. B. Gilchrist
H. R. Sullivan

Inventor
Charles W. Hill
by Thurston & Kwis
Attys

UNITED STATES PATENT OFFICE.

CHARLES W. HILL, OF LAKEWOOD, OHIO, ASSIGNOR TO NATIONAL CARBON COMPANY, OF CLEVELAND, OHIO, A CORPORATION OF NEW JERSEY.

ELECTRODE FOR FLAMING-ARC LAMPS.

1,007,869.             Specification of Letters Patent.        Patented Nov. 7, 1911.

Application filed September 21, 1910. Serial No. 582,980.

*To all whom it may concern:*

Be it known that I, CHARLES W. HILL, a citizen of the United States, residing at Lakewood, in the county of Cuyahoga and State of Ohio, have invented a certain new and useful Improvement in Electrodes for Flaming-Arc Lamps, of which the following is a full, clear, and exact description.

This invention relates to electrodes for use in flaming arc lamps and has for its purpose to produce an electrode which when in use will automatically, so to speak, produce an arc which changes in color from time to time.

Generally speaking, the invention comprises the elements and combinations thereof shown in the accompanying drawings.

Reference should be had to the accompanying drawing forming a portion of this specification in which—

Figure 1:
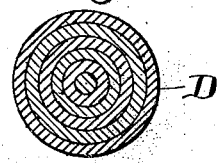
Figure 3:
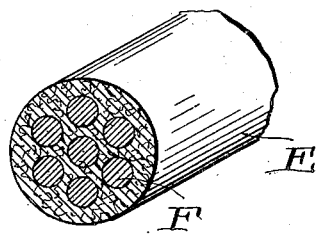
Figure 2:
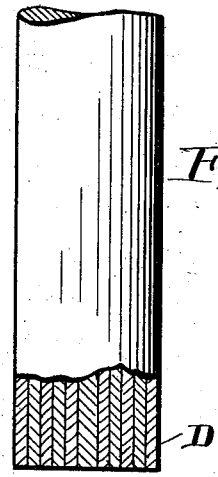
Figure 4:
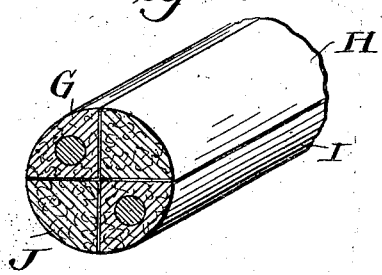
Figure 5:
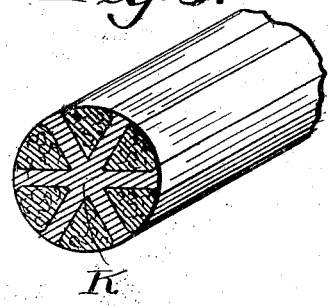
Figure 6:
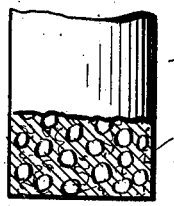
Figure 7:
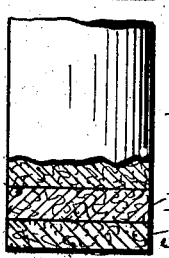
Figure 8:

Figure 1 is a horizontal cross section of the showing in Fig. 2; Fig. 2 is an elevation partly in section of an electrode constructed in accordance with this invention showing the flame producing material arranged in different manners; Fig. 3 shows a portion of an electrode in cross section which is cored and the core space is filled with the color producing material. Fig. 4 shows a portion in section of an electrode composed of a plurality of individual electrodes which are associated together. Fig. 5 shows a fluted electrode of special form in which the spaces are filled with the color producing material. Figs. 6 and 7 are elevations partly in section of different forms the electrode may assume. Fig. 8 is a cross section of a further modified form of electrode.

It is a well known fact that certain substances introduced into an arc impart a characteristic color to the arc stream, as, for example, certain calcium salts impart a yellow color, certain lithium and strontium salts impart a red color. Therefore, if portions of various color-producing substances be incorporated in an electrode, the arc will attack these substances as the electrode is consumed, and the substance thus attacked will volatilize and produce its characteristic color in the arc stream.

It is preferred to so incorporate the various substances with the electrode that the arc will successively assume a different color. There are a multitude of ways in which the color producing material may be incorporated in the electrode, and it will be quite impracticable to set them all forth. However, the more clearly to present the invention, the following illustrations are given. The body of the electrode may be constructed as illustrated at D in Figs. 1 and 2, wherein the carbon is composed of a series of rings which encircle each other, the material in each ring being impregnated with a substance which produces the color desired. When the arc shifts from ring to ring, the different color effects will be produced. If, for instance, the arc be in contact with the outer ring, a certain color, say red, will be imparted to the arc stream, then when the arc shifts to another ring, for instance, the next to the outer ring, the color of the arc will be changed, say to green. This succession of changes will take place as the arc moves from ring to ring.

In Fig. 6 is shown a different manner of incorporating the coloring material, namely, in the form of pellets C and where this is done, the pellets are scattered promiscuously throughout the length of the carbon. The pellets will contain the coloring substances and as the electrode is consumed, a pellet imparting say a yellow color will be consumed and immediately following a pellet imparting say a green color.

In Fig. 7 the body is shown as composed of a series of sections or segments as represented at A and B. Each of the adjacent segments containing a different coloring material. So long as the arc is in contact with the segment A a definite color will be given to the arc; we will say that it is blue. When, however, the section A is consumed and the arc contacts the section B, then the particular material with which this section is impregnated manifests itself and imparts its characteristic color to the arc, which may be yellow.

The manner of incorporating the color producing material just described has been shown in connection entirely with a solid carbon, but it will be perfectly obvious that cored carbon can be utilized in a similar manner and produce the same result. That is to say, the core may be filled with material arranged as shown at A and B, or with material arranged as shown at C and D, and produce the same result as far as the color of the arc is concerned. Again, in addition to the core, the body of the carbon itself may be impregnated with color producing material arranged in any of the ways or combinations thereof suggested in Figs. 2, 6 and 7.

In Fig. 3 is shown a solid carbon E which is provided with a plurality of cored portions F. These cored portions are filled with a suitable mixture which contains a color producing substance, and if desired, the various cores will be filled with substances which produce different colors.

In Fig. 4 there is illustrated an electrode formed from a series of individual electrodes G, H, I and J, which are assembled so as to form a unitary electrode. Each of these individual members of the electrodes G, H, I and J may be a solid carbon, of any desired shape of cross section, as shown at H and J, or any or all may be cored carbons, as are the members G and I. The solid carbons H and J may be made up as indicated with respect to Fig. 2, and the cored carbons may be made up the same as before described with respect to the cored carbon, and if it be desired, the portions of the members G and I which are solid may be impregnated with flame producing material in any manner, such as shown in Fig. 2.

In Fig. 5 is illustrated still another form of electrode, which comprises a body K formed with a plurality of radiating arms, the spaces between the arms being filled with a mixture impregnated with color producing material, and, if desired, a different coloring material may be incorporated in each of the different portions of the mix which fill the spaces between the arms and in the shell itself, if desired.

In Fig. 8, the electrode shown has a regular carbon body in which flaming material may be incorporated, if desired. Extending through the body portion are other carbon bodies containing flaming material which may be constructed in a manner similar to the forms of electrodes heretofore described.

The invention may be embodied in electrodes differing in their precise construction from those herein shown and described, and therefore I do not limit myself to any exact construction except as defined in the claims.

Having described my invention, I claim:

1. An electrode for flaming arc lamps in which are incorporated different substances each substance producing its characteristic color when successively attacked by the arc thereby producing a succession of color changes.

2. An electrode for flaming arc lamps in which are incorporated in different portions thereof, different substances the volatilization of each of which imparts to the arc stream a characteristic color whereby a succession of color changes is imparted to the arc as the electrode is consumed.

In testimony whereof, I hereunto affix my signature in the presence of two witnesses.

CHARLES W. HILL.

Witnesses:
F. D. LAURENCE,
C. E. BERKETT.